(12) United States Patent
Feldman

(10) Patent No.: US 10,524,452 B2
(45) Date of Patent: Jan. 7, 2020

(54) MODULAR SHELVING SYSTEM WITH ADD-ON FEATURES DESIGNED FOR DOMESTIC CATS

(71) Applicant: Aaron Joseph Feldman, Berkeley, CA (US)

(72) Inventor: Aaron Joseph Feldman, Berkeley, CA (US)

( * ) Notice: Subject to any disclaimer, the term of this patent is extended or adjusted under 35 U.S.C. 154(b) by 7 days.

(21) Appl. No.: 15/731,694

(22) Filed: Jul. 19, 2017

(65) Prior Publication Data
US 2019/0021284 A1    Jan. 24, 2019

(51) Int. Cl.
| | | |
|---|---|---|
| *A01K 15/02* | (2006.01) | |
| *A47B 57/04* | (2006.01) | |
| *A47B 96/07* | (2006.01) | |
| *A47B 47/00* | (2006.01) | |
| *A47B 96/06* | (2006.01) | |
| *A47B 96/02* | (2006.01) | |
| *A47B 47/04* | (2006.01) | |

(52) U.S. Cl.
CPC ........ *A01K 15/024* (2013.01); *A47B 47/0091* (2013.01); *A47B 47/047* (2013.01); *A47B 57/04* (2013.01); *A47B 96/027* (2013.01); *A47B 96/028* (2013.01); *A47B 96/066* (2013.01); *A47B 96/07* (2013.01)

(58) Field of Classification Search
CPC .. A01K 15/024; A47B 96/063; A47B 96/025; A47B 96/066; A47B 96/061; A47B 96/028; A47B 96/027; A47B 96/02; A47B 96/07; A47B 47/022; A47B 57/045; A47B 57/56; A47B 57/562; A47B 47/0091; A47B 47/047
USPC .......................................... 211/90.01; 108/6
See application file for complete search history.

(56) References Cited

U.S. PATENT DOCUMENTS

| | | | | |
|---|---|---|---|---|
| 7,934,470 B1* | 5/2011 | Barker | ................... | A01K 1/035 119/28.5 |
| 8,707,906 B1* | 4/2014 | Trojanowski | .......... | A01K 15/02 119/706 |
| 2007/0125738 A1* | 6/2007 | Sevack | ................ | A47B 96/066 211/187 |
| 2015/0096954 A1* | 4/2015 | Liu | ..................... | A47B 47/0066 211/186 |
| 2017/0280874 A1* | 10/2017 | Sosso | ..................... | A47B 96/07 |

\* cited by examiner

*Primary Examiner* — Daniel J Colilla

(57) ABSTRACT

A modular shelving system with a series of shelves, shelf-support brackets, bracket attachment disks, and hinge-pins. The support brackets are hingable. The support disks each include a series of radially disposed apertures and additional apertures for allowing the disk to be fastened to a wall or stud. The shelf support brackets include shelf-receiving slots and a post extending from the bracket that can be inserted into one of the radially disposed apertures. The hinge-pin is threaded to be screwed into the bracket-receiving disks. The shelves are inserted into the shelf-receiving slots in the shelf-support brackets to create a custom climbing shelf design for climbing animals such as cats.

4 Claims, 15 Drawing Sheets

MODULAR SHELVING SYSTEM WITH ADD-ON FEATURES DESIGNED FOR DOMESTIC CATS

CROSS REFERENCE TO RELATED APPLICATIONS

Not Applicable

STATEMENT REGARDING FEDERALLY SPONSORED RESEARCH OR DEVELOPMENT

Not Applicable

DESCRIPTION OF ATTACHED APPENDIX

Not Applicable

BACKGROUND OF THE INVENTION

The field of the present invention is modular shelves that are mounted to a wall. Though the invention is usable as shelves for books or decorative items, the present invention is particularly useful as a modular climbing and perching system for domestic cats.

Climbing pets, such as domestic cats, love to climb up to and perch on surfaces that are some distance from the ground. Many cat-climbing devices are available on the market today, including carpeted climbing posts that have shelf-like surfaces attached to the post at different levels. Some cat climbing enthusiasts have invented patent shelf systems for cats such as Thomas Conwell's now expired U.S. Pat. No. 5,809,933 showing a plurality of shelves that are mounted at different levels on a wall. More recently N. Bruce Barker, in his U.S. Pat. No. 7,934,470 describes a cat perch system that uses a series of horizontal posts mounted to a wall where flexible panels can be mounted and extend from one post to another to create a series of shelves that a cat can climb or sit on.

Although the Barker patent uses the posts as a hinge point to join adjacent shelves together, it does not accommodate for the ability to join two rigid shelves together in a hinged fashion. Additionally, the posts must be connected to a horizontal support plate, and the support plate is then screwed to the wall, creating additional materials and expense to attach the posts to the wall. The aesthetics of the room are also compromised.

BRIEF SUMMARY OF THE INVENTION

The primary object of the invention is to provide a system of rigid shelves and brackets that allows a cat or other climbing animal to walk, run, climb, and perch on a variety of levels.

Another object of the invention is to provide a cat shelf system that allows the user to adjust shelves and ramps to a variety of angles when fastened to a wall.

Another object of the invention is to provide a cat shelf system that can be modified to include play toys and other accessories that can be connected to the shelves.

A further object of the invention is to provide a cat shelf system whose shelves and brackets are designed to be covered with a carpet material.

Yet another object of the invention is to provide a cat shelf system that can be easily customized to adapt to a wide variety of wall arrangements.

Other objects and advantages of the present invention will become apparent from the following descriptions, taken in connection with the accompanying drawings, wherein, by way of illustration and example, an embodiment of the present invention is disclosed.

In accordance with a preferred embodiment of the invention, there is disclosed a modular shelving system comprising: a plurality of shelves, a plurality of shelf support brackets, a plurality of bracket attachment disks, a plurality of hinge pins, said support brackets being hingable, said support disks each including a plurality of radially disposed apertures, said support disks also each including additional apertures for allowing said disk to be fastened to a wall or stud, said shelf support brackets including shelf receiving slots, said shelf support brackets also including an integral post extending from the distal end of said bracket which can be inserted into one of the said radially disposed apertures, said hinge-pin including a threaded distal end capable of being screwed into a central threaded female aperture in to said bracket receiving disk, said hinge-pin also including a tool receiving aperture, allowing a user to screw said hinge-pin into said bracket receiving disk, and said shelves capable of being inserted into said shelf receiving slots in said shelf support brackets creating a modular shelving system ideal for domestic cats.

BRIEF DESCRIPTION OF THE DRAWINGS

The drawings constitute a part of this specification and include exemplary embodiments to the invention, which may be embodied in various forms. It is to be understood that in some instances various aspects of the invention may be shown exaggerated or enlarged to facilitate an understanding of the invention.

DETAILED DESCRIPTION OF THE PREFERRED EMBODIMENTS

Detailed descriptions of the preferred embodiment are provided herein. It is to be understood, however, that the present invention may be embodied in various forms. Therefore, specific details disclosed herein are not to be interpreted as limiting, but rather as a basis for the claims and as a representative basis for teaching one skilled in the art to employ the present invention in virtually any appropriately detailed system, structure, or manner.

Figure 1:
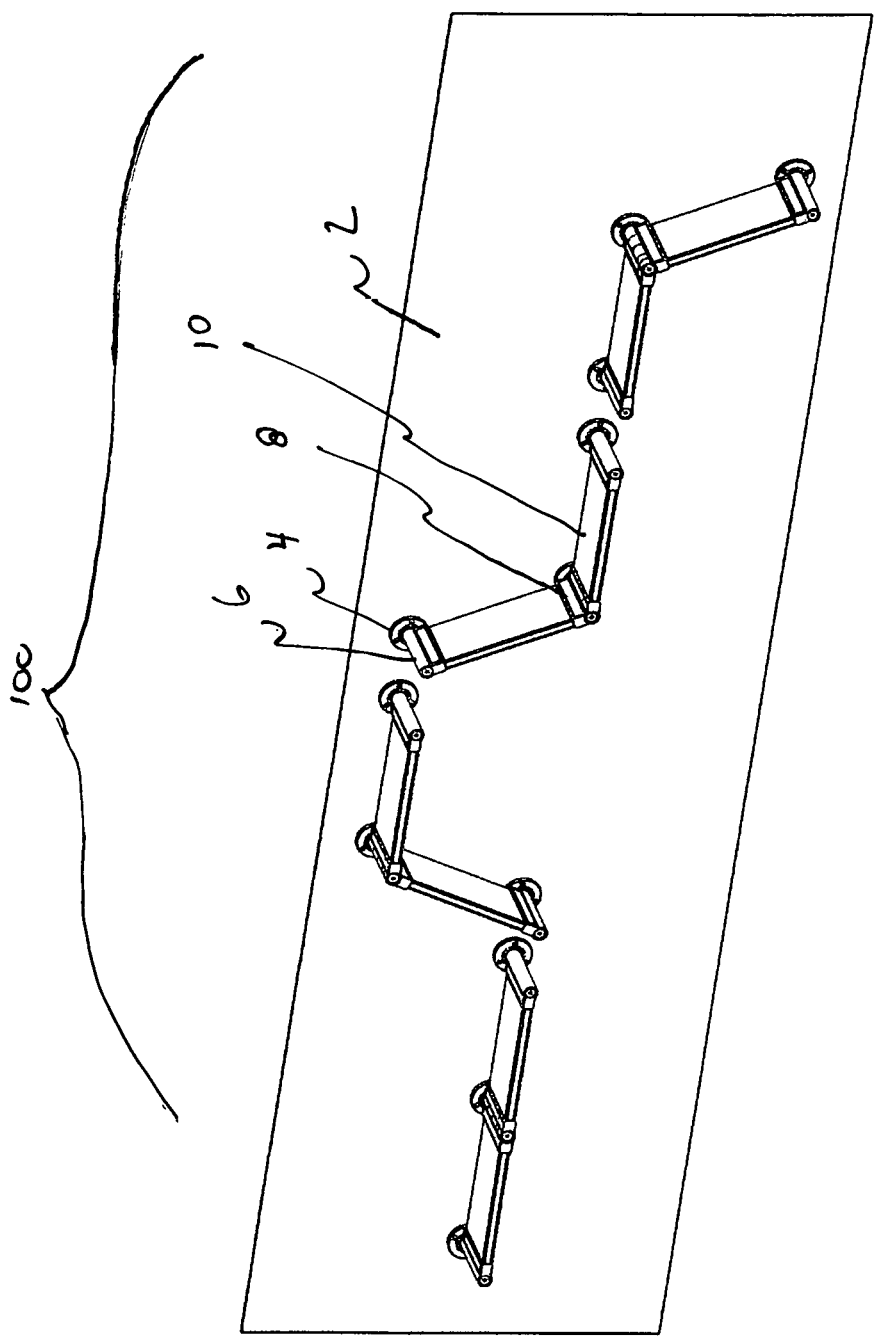
FIG. 1 is a perspective view of the invention attached to a wall.

Referring now to FIG. 1 we see a perspective view of the invention 100 which is a series of shelves 10 end brackets 6, a central bracket assembly 8 and bracket holding disks 4 that hold the shelves to the wall 2. The shelves 10 are rigid and can be sized to any length that the user wishes based on the overall size and length of the wall and complexity of the shelf system desired.

Figure 2:
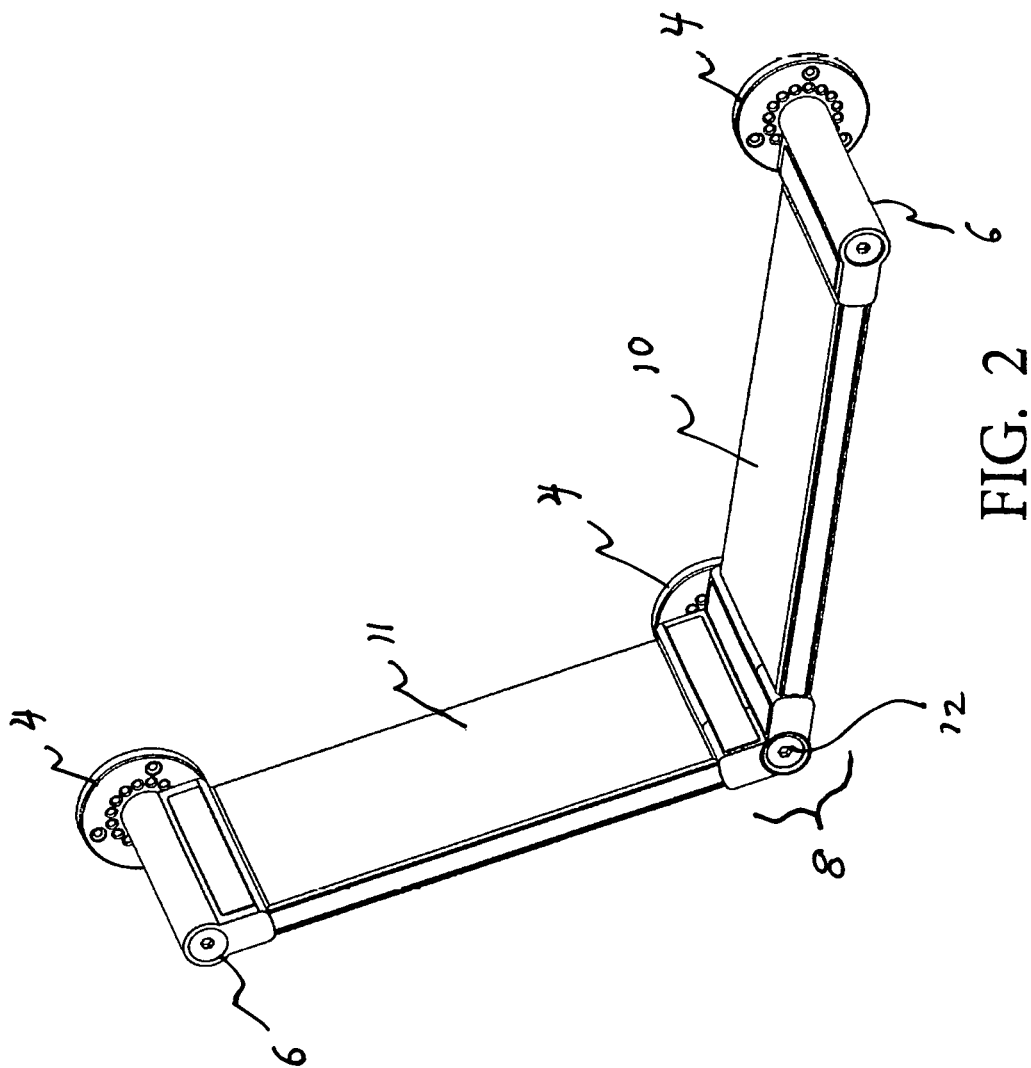
FIG. 2 is a perspective view of two shelves seen from the front connected by a hinged bracket.

FIG. 2 is a perspective view of two shelves 10, 11 connected by a central bracket assembly 8 and two end brackets 6, each attached to their own bracket support disks 4. The shelves 10, 11 can be joined at a variety of angles based on the user's design choices.

Figure 3:
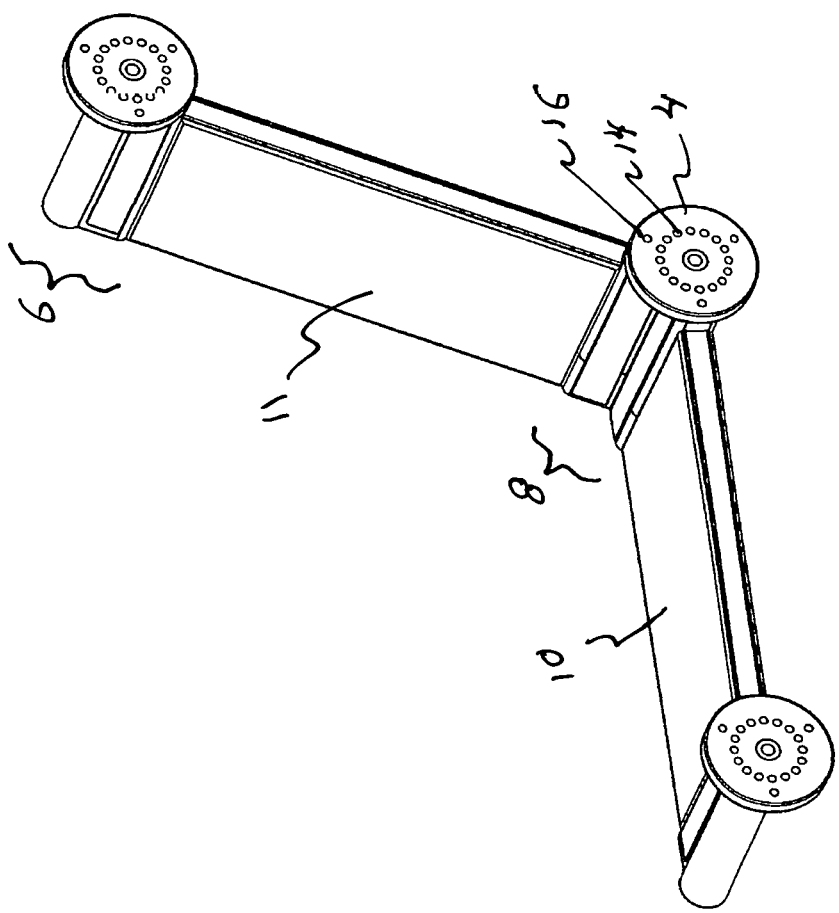
FIG. 3 is a perspective view of two shelves seen from the rear connected by a hinged bracket.
Figure 8:
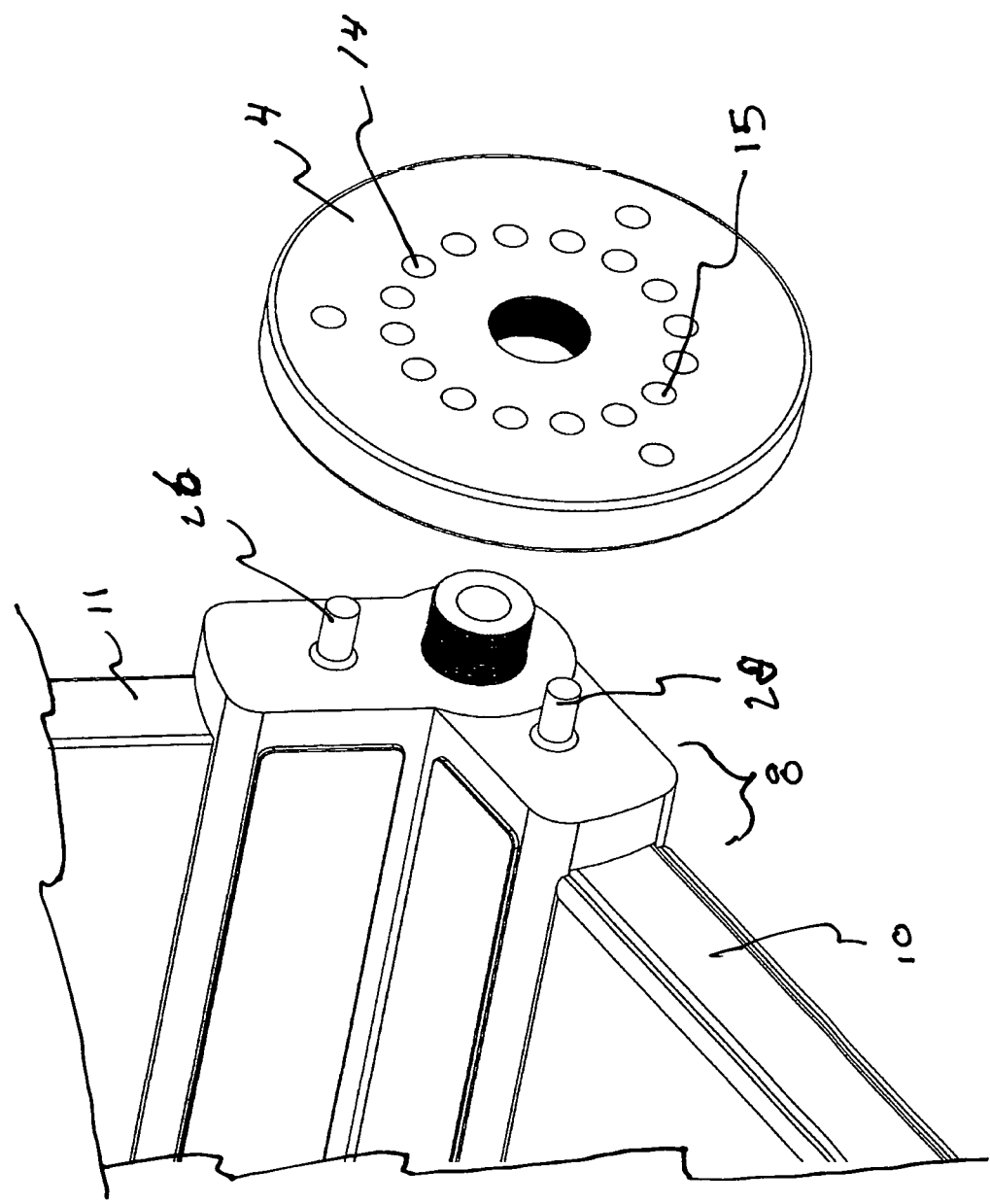
FIG. 8 is a partial perspective view of the hinged shelf support and support disk.

FIG. 3 is a perspective view of the same two shelves 10, 11 seen from the rear. A series of radially disposed apertures 14 in the disk 4 that allows for positioning of posts 26, 28, as shown in FIG. 8, protruding from the central bracket assembly 8, to engage apertures 14, in the disk 4 thereby securing the angle of the shelves 10, 11 in the desired position.

Figure 4:
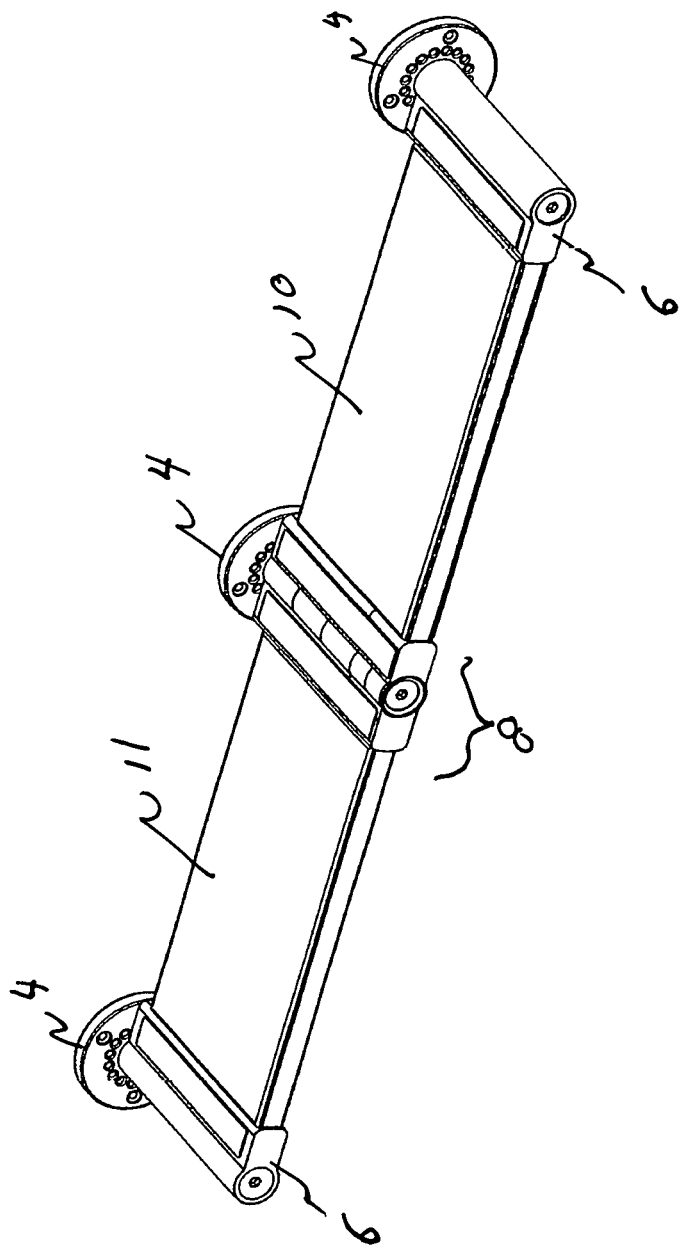
FIG. 4 is a perspective view of two shelves that are in a parallel configuration.

FIG. 4 shows the shelves 10, 11 in a parallel position with respect to each other. The shelves can be angled to any of the degrees of angle allowed by the location of apertures in the disk 4.

Figure 5:
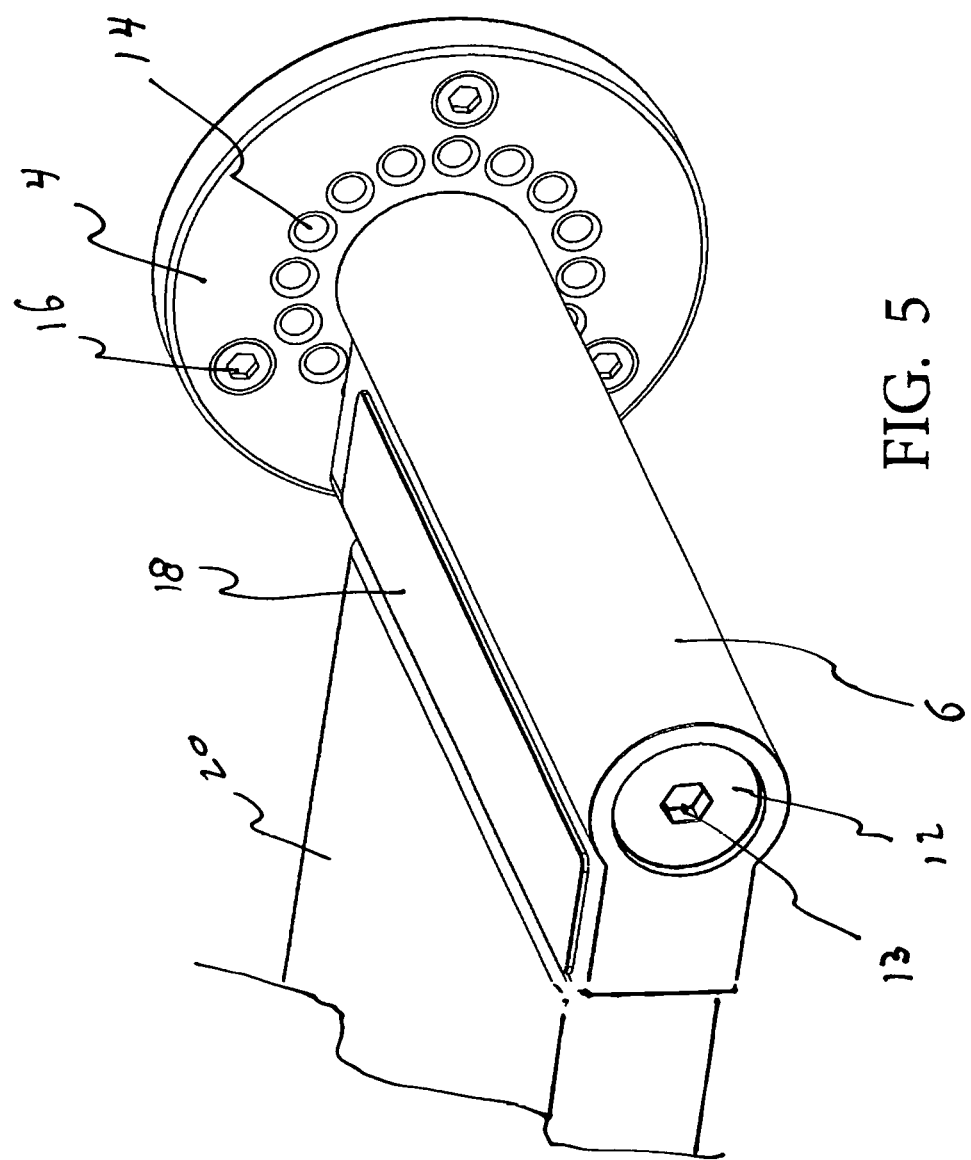
FIG. 5 is a partial perspective view of the shelf end cap bracket and support disk.

FIG. 5 is a partial perspective view of a post 12 and the end cap bracket 6 and a portion of a shelf covered by carpeting 20. The end cap bracket 6 includes recessed portions that can retain a panel of carpeting 18. This feature allows the entire shelf and bracket surface to be covered by carpeting or other material that is attractive to cats.

The post 12 also includes a tool receiving aperture 13, allowing a user to screw the post 12 into the bracket receiving disk 4.

Figure 6:
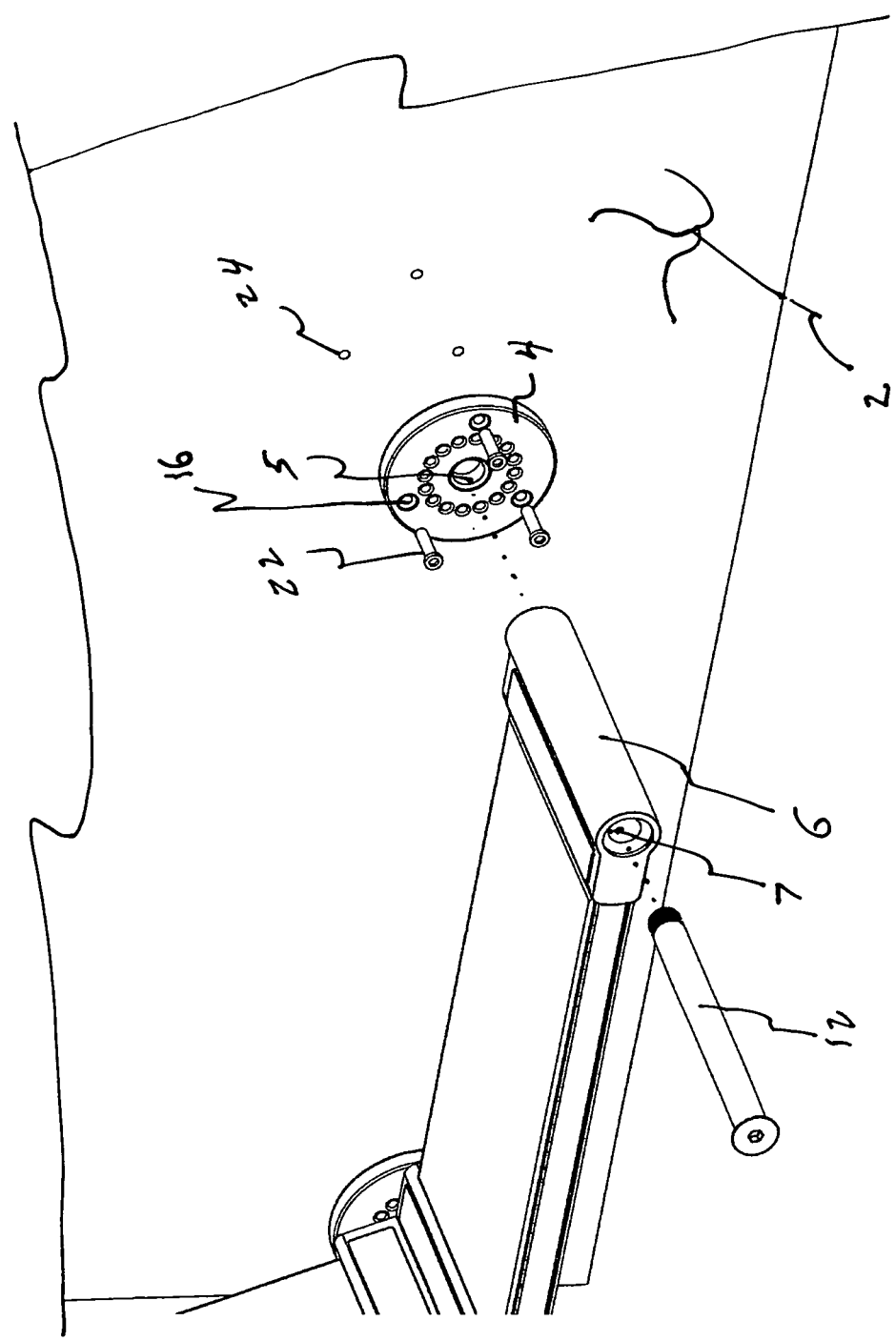
FIG. 6 is an exploded view of a shelf being attached to a wall.

FIG. 6 is an exploded view that clearly shows how in the disk 4 is attached by screws 22 through aperture 16. The end cap bracket 6 is attached with screws through holes 24 a wall 2 or stud located within the wall 2.

Figure 7:
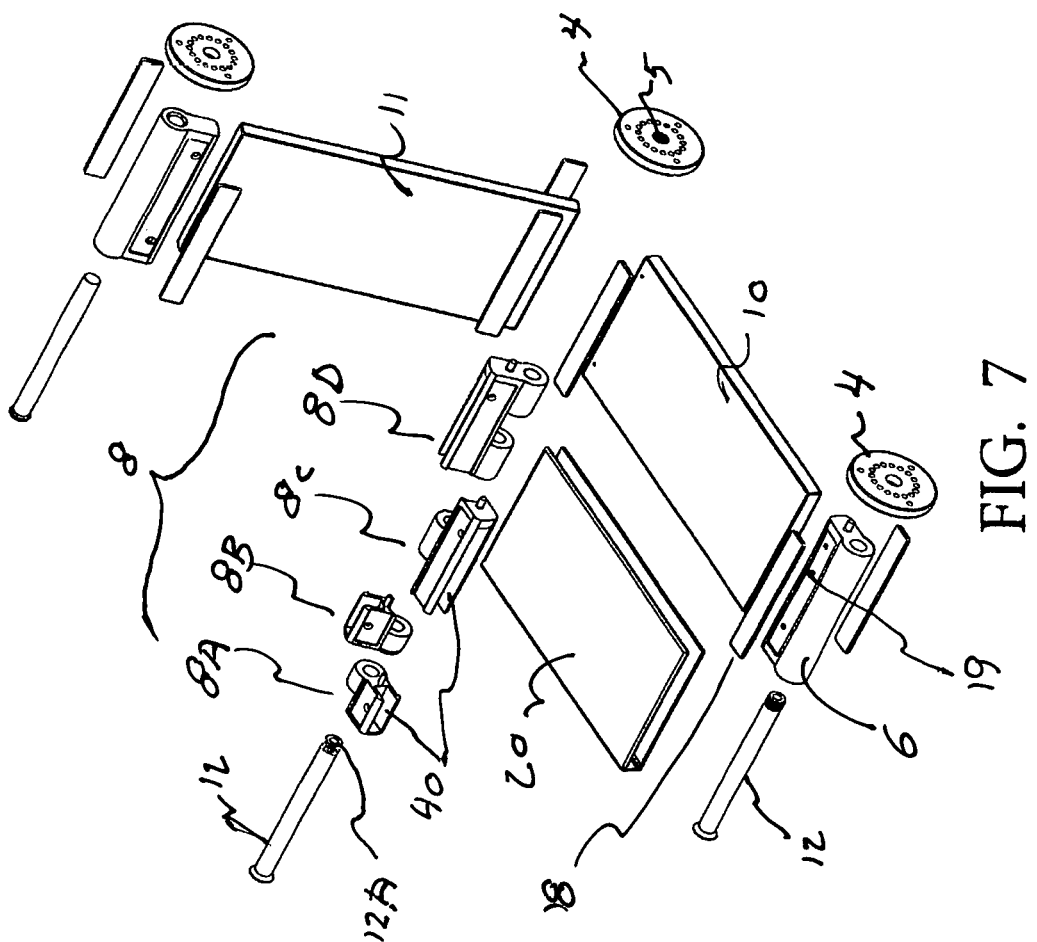
FIG. 7 is an exploded view of the invention.

FIG. 7 is an exploded view of the invention. The hinge bracket 8 is made up of end caps 8A, 8B, first hinge member 8C and second hinge member 8D. The post 12 is inserted into all the hinge bracket members 8A, 8B, 8C, 8D so that the threaded portion 12A can be screwed into threaded aperture 5 in disk 4. The brackets 6, 8 each include slots 40 in which the shelves 10, 11 can be inserted. Carpet or VELCRO panels 20, can be clearly seen which sit in depressions in the bracket members 6, 8 and are adhered by standard means into the recessed areas 19 of the brackets 6, 8.

FIG. 8 is a partial perspective view of shelves 10, 11 plugged into the hinge bracket 8. Positioning posts 26, 28 lock into apertures 14, 15 to lock the angle of the hinge bracket 8 in to the desired position.

Figure 9:
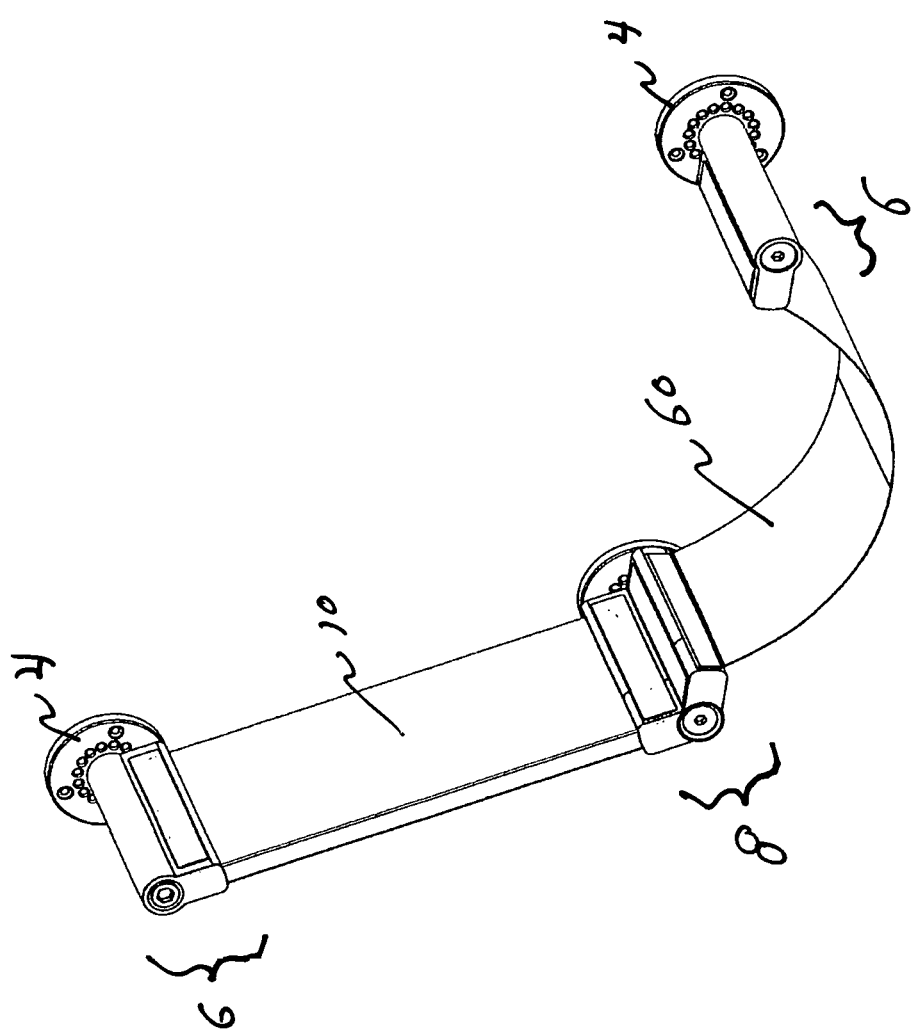
FIG. 9 is a perspective view of the invention with a flexible shelf member.

FIG. 9 is a perspective view of the invention with a flexible panel 60 made out of fabric or other flexible material. This can be an alternative to the shelves 10, 11 described previously.

Figure 10:
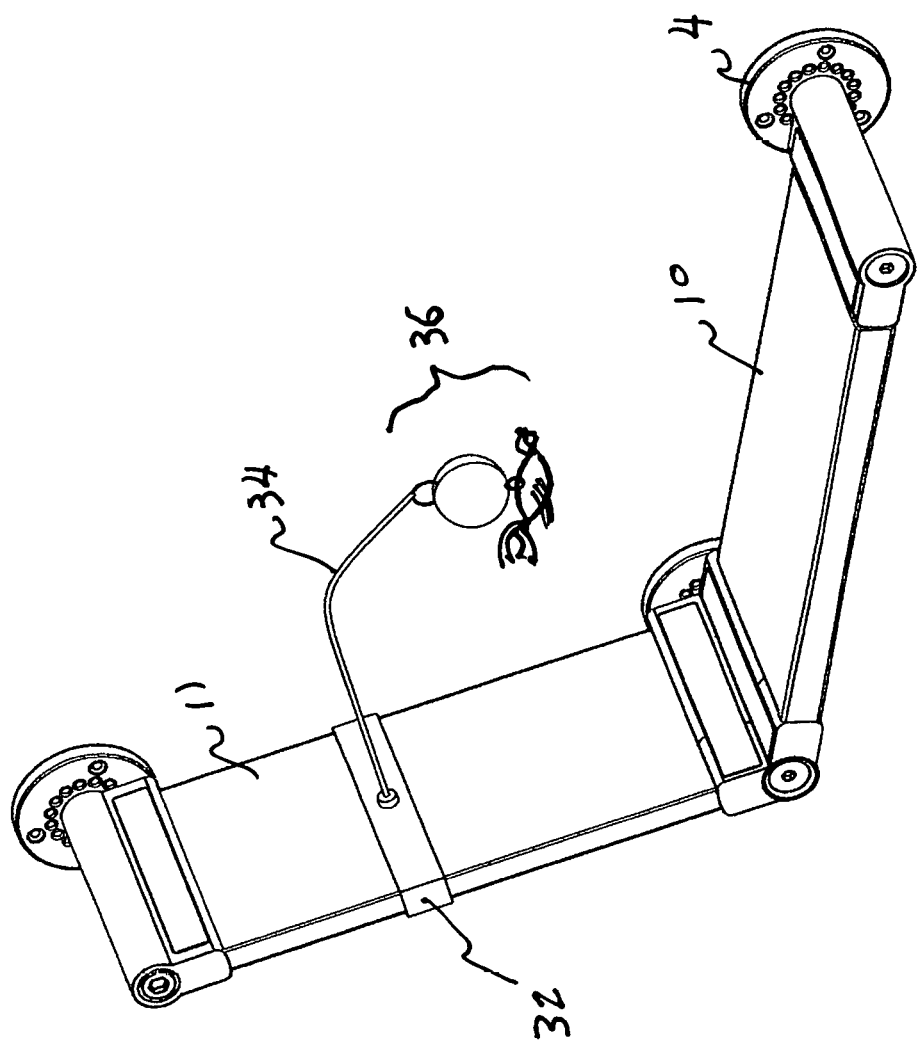
FIG. 10 is a perspective view of the invention with a cat toy attached.

FIG. 10 is a perspective view of the invention with the addition of a cat toy 36, which is comprised of an attachment panel 32 that slides onto the shelf 11. An elongated member 34 is attached at one end to the attachment panel 32 and at the other end to a cat toy 36 such as a representation of a bird. The attachment panel 32 can be slid to any height and remain there via frictional forces. A wide variety of toys can be attached to the flexible rod 34. Rod 34 can also be a variety of lengths. Other items that can be attached to the shelves are various lengths of poles which may be covered in carpet or sisal rope for a cat to climb on.

Figure 11:
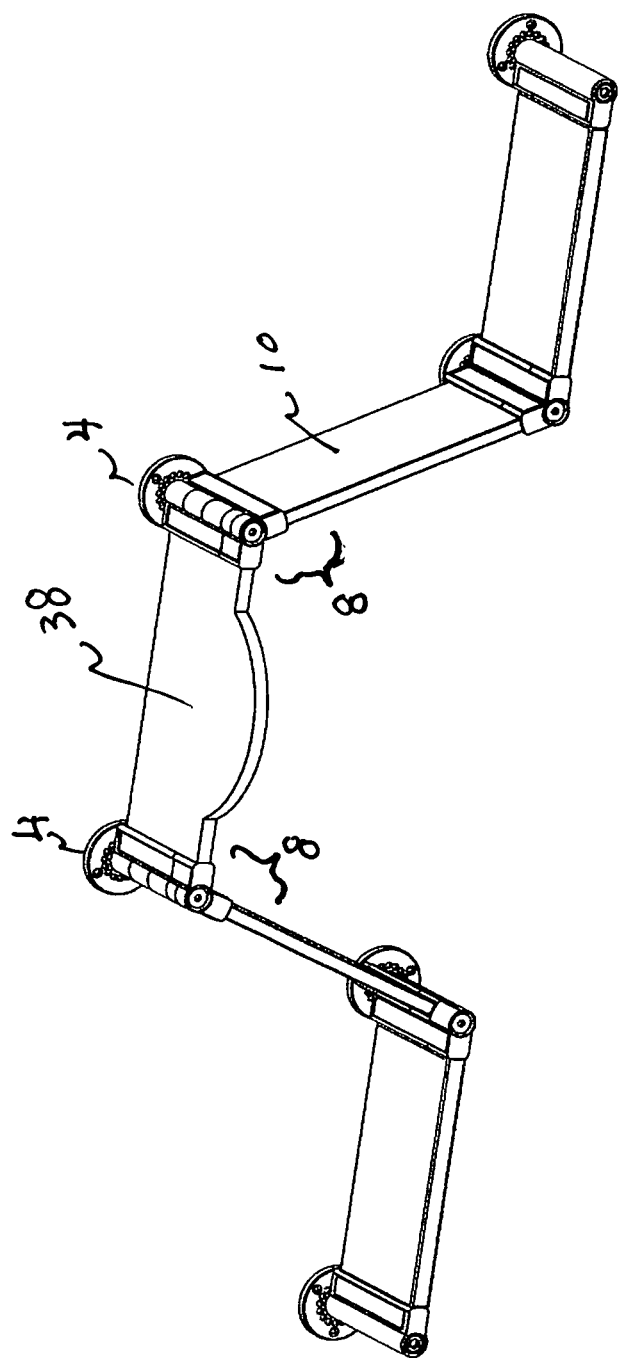
FIG. 11 is a perspective view of the invention with a forwardly extended shelf.

FIG. 11 is a perspective view of the invention showing one shelf 38 having a forwardly disposed extension allowing a cat to have a larger panel upon which to perch.

Figure 12:
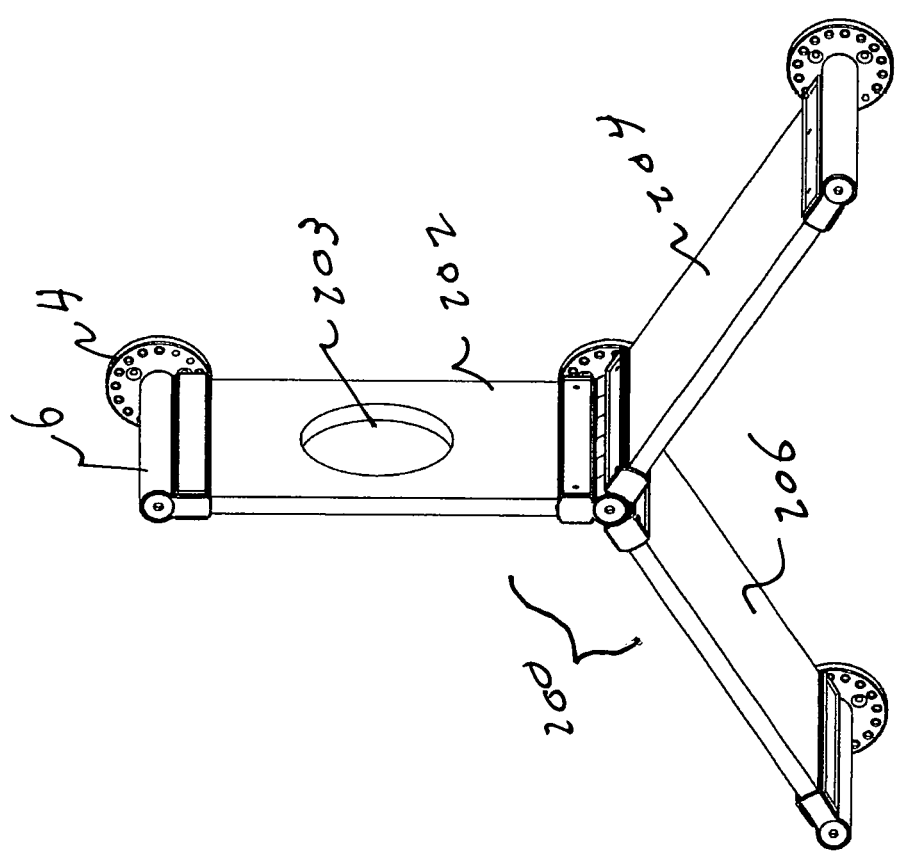
FIG. 12 is a perspective view of an alternate embodiment of the invention with a three-way hinge capability.

FIG. 12 is a perspective view of an alternate embodiment of the hinge member 200 that allows three shelves 202, 204, 206 to be attached rather than two. The shelves can terminate in the end cap bracket 6 and be supported by the support disk 4, as in the original embodiment. In the embodiment shown, a shelf member 202 includes a through-hole 203 that can let a cat jump through the hole 203 from one shelf 204 to another 206. This configuration gives extra play value to the entire shelf assembly.

Figure 13:
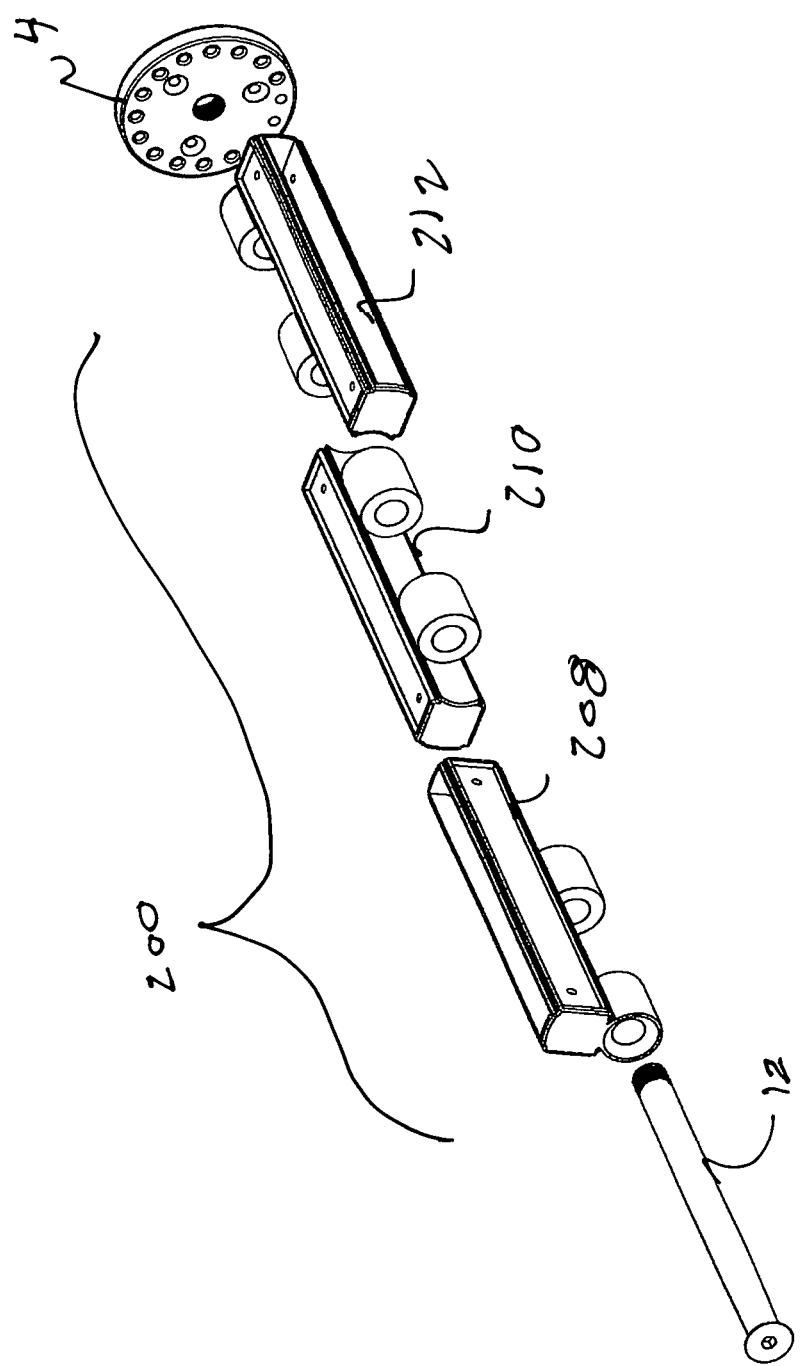
FIG. 13 is an exploded view of the three-way hinge.

FIG. 13 is an exploded view of the three-way hinge 200. Shelf-receiving brackets 208, 210 and 212 are pinned together by 12, which threads into the support disk 4, as in the original embodiment.

Figure 14:
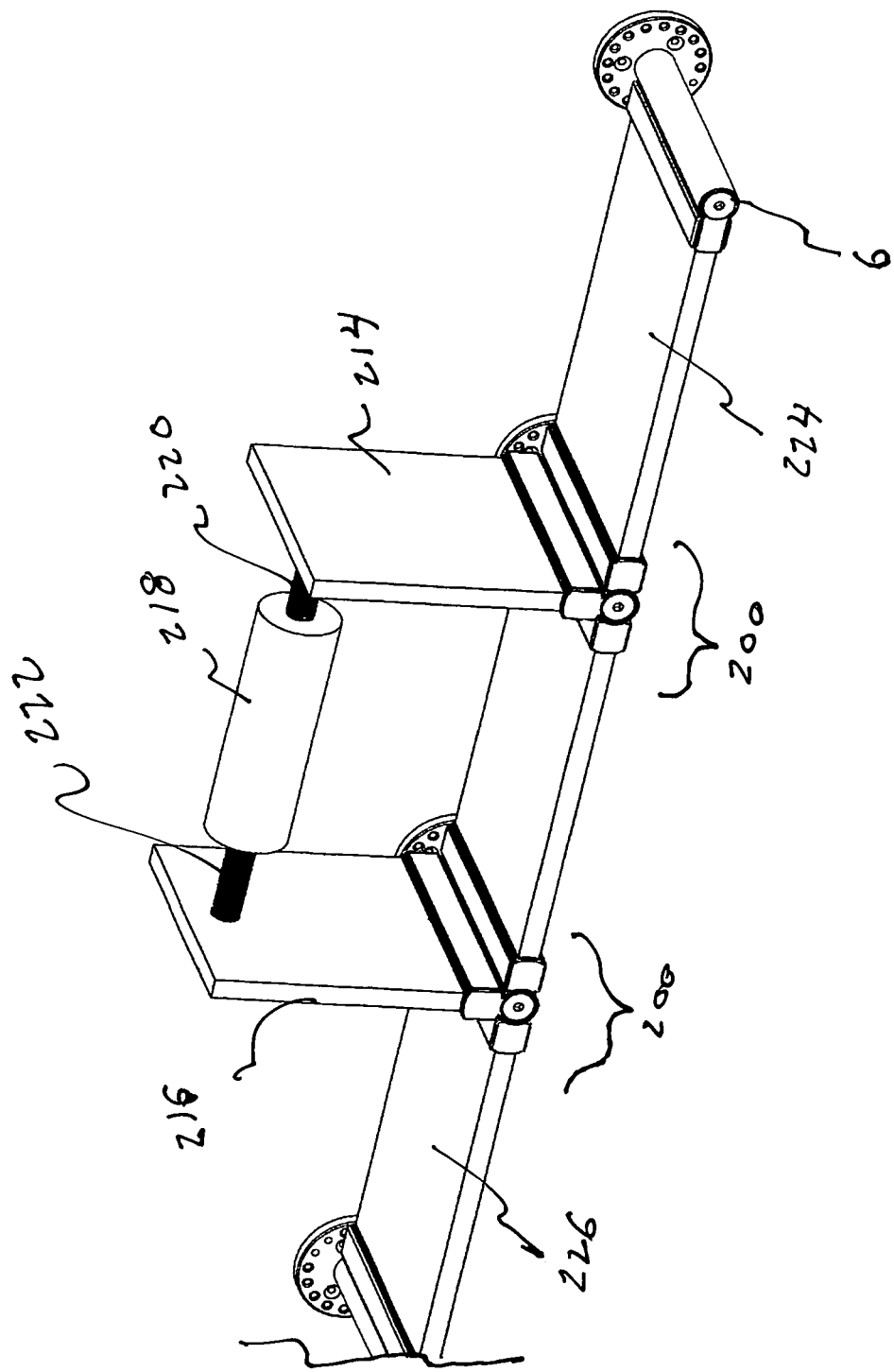
FIG. 14 is a perspective view of the three-way hinge in use.

FIG. 14 shows another design that can be accomplished by the three-way hinge 200. In this version two shelves 214, 216 are placed vertically, and a horizontal carpet covered cylinder 218 supported by compression springs 220, 222 so that a cat can walk along a horizontal shelf 224, then climb up shelf 214, walk across cylinder 218 which will be moving slightly due to the movement of springs 220, 222, and continue down shelf member 216 and onto horizontal shelf member 226.

Figure 15:
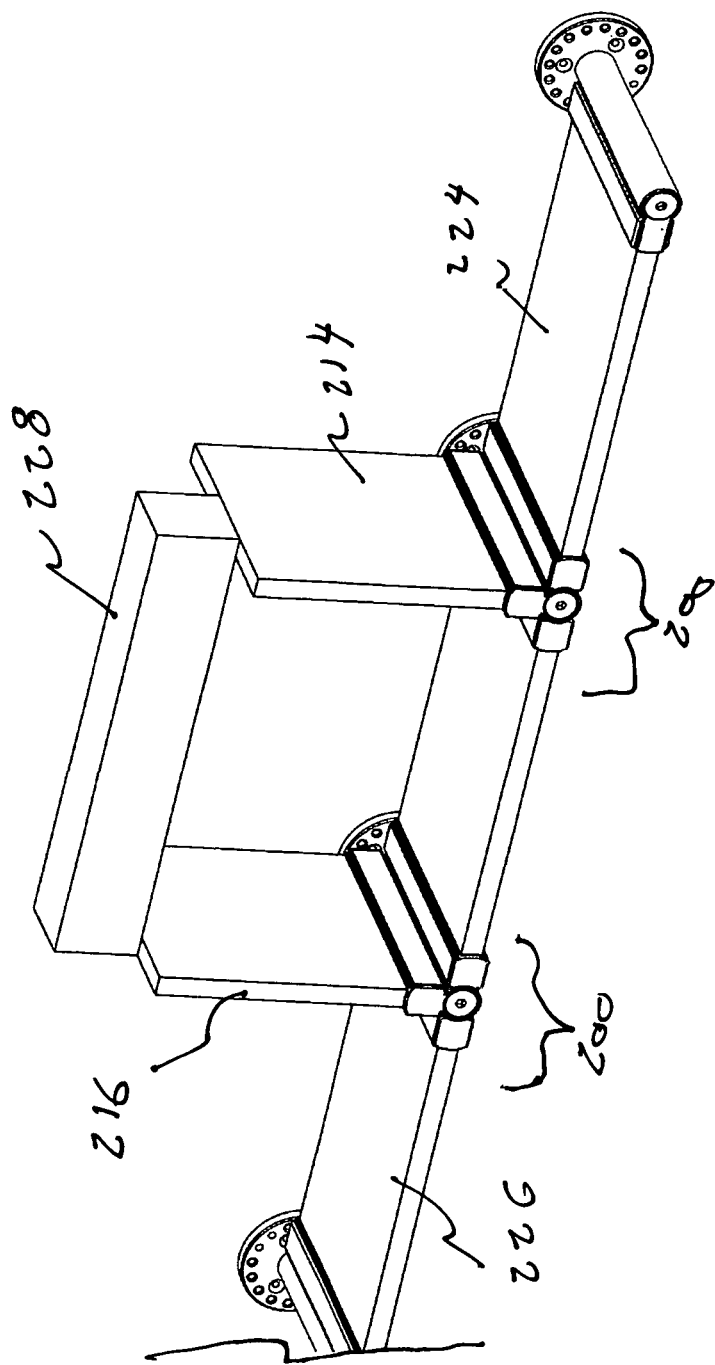
FIG. 15 is a perspective view of a second version of the three-way hinge in use.

FIG. 15 is another variation that can be accomplished with the three-way hinge 200. This version substitutes a wooden narrow plank 228 for the cylindrical member 218. The wooden narrow plank 228 allows a cat to walk on a narrow beam, which also provides interest and exercise for the cat.

It should be noted that other features can be added to the shelves 10, 11 such as sound speakers, large apertures for allowing a cat to pass through the shelf member, transparent shelf members so that a person can see a cat from underneath, shelves with places to store food or water and shelves that include LED lights for night time illumination. Another option is to have interactive shelves that use motion sensing, touch sensing and other electronic components that allow additional play features to activate for engaging cats in the environment. Activation may also be accomplished by remote means including a custom phone app.

The above described and illustrated invention allows a person to create a wide variety of custom cat climbing and perching designs using multiple brackets and disks that are each uniform in nature. A set of brackets and discs can be sold to an end user who can then cut shelving material to the ideal length to create a custom design. Alternately, the manufacturer of the brackets of the present invention can offer stock sized shelves, or can interact with the end user via the internet to build custom length shelves and covered with custom carpeting or other material, and send them to the end user for installation.

While the invention has been described in connection with a preferred embodiment, it is not intended to limit the scope of the invention to the particular form set forth, but on the contrary, it is intended to cover such alternatives, modifications, and equivalents as may be included within the spirit and scope of the invention as defined by the appended claims.

What is claimed is:

1. A modular shelving system comprising:
  a plurality of shelves;

a plurality of shelf support brackets;
a plurality of bracket attachment disks;
a plurality of hinge pins;
said support brackets being hingable;
said support disks each including a plurality radially disposed apertures;
said support disks also each including additional apertures for allowing said disk to be fastened to a wall or stud;
said shelf support brackets each including at least one shelf receiving slot;
said shelf support brackets also including an integral post extending from the distal end of said bracket which can be inserted into one of the said radially disposed apertures;
said plurality of hinge-pins each including a threaded distal end capable of being screwed into a central threaded female aperture in each of said bracket attachment disks;
said plurality of hinge-pins also each including a tool receiving aperture allowing a user to screw a respective hinge-pin of said plurality of hinge-pins into any of said bracket attachment disks; and
said shelves capable of being inserted into said shelf receiving slots in said shelf-support brackets.

2. A modular shelving system as claimed in claim 1 wherein said shelf-support brackets include a hinged-type bracket that support two connecting shelves and an end cap bracket supporting the end of a shelf.

3. A modular shelving system as claimed in claim 1 wherein said brackets each includes one or more shallow recesses that can accept carpet or hook and loop fastener panels that can be attached via standard means.

4. A modular shelving system as claimed in claim 1 wherein said shelf-support brackets include an end-cap bracket that encloses a front end of a respective shelf member of the plurality shelves that is being supported in said at least one shelf receiving slot.

\* \* \* \* \*